US012585029B2

(12) United States Patent
Mohammed

(10) Patent No.: US 12,585,029 B2
(45) Date of Patent: Mar. 24, 2026

(54) ENHANCED POSITIONING FOR LOCATION SERVICES

(71) Applicant: QUALCOMM Incorporated, San Diego, CA (US)

(72) Inventor: Qutubuddin Mohammed, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 18/531,439

(22) Filed: Dec. 6, 2023

(65) Prior Publication Data

US 2025/0189680 A1 Jun. 12, 2025

(51) Int. Cl.
*G01S 19/39* (2010.01)
*G01S 5/02* (2010.01)
(52) U.S. Cl.
CPC .......... *G01S 19/396* (2019.08); *G01S 5/0236* (2013.01)
(58) Field of Classification Search
CPC .............................. G01S 19/396; G01S 5/0236
See application file for complete search history.

(56) References Cited

U.S. PATENT DOCUMENTS

| | | | | |
|---|---|---|---|---|
| 9,020,523 B2 * | 4/2015 | Moeglein | ................ | G01S 19/25 |
| | | | | 455/456.1 |
| 9,031,572 B2 * | 5/2015 | Riley | ...................... | G01S 19/46 |
| | | | | 455/456.6 |
| 2023/0262416 A1 * | 8/2023 | Edge | ..................... | H04W 12/61 |
| | | | | 455/456.1 |

* cited by examiner

*Primary Examiner* — Kabir A Timory
(74) *Attorney, Agent, or Firm* — Polsinelli

(57) ABSTRACT

Disclosed are systems and techniques for wireless positioning. For example, a computing device can determine a device is static. The device can determine a plurality of space vehicles (SVs) comprises more than a threshold number of SVs. The device can determine measurement errors of measurements of signals from one or more SVs of the plurality of SVs are greater than a horizontal uncertainty for the device based on current external positioning assistance data for the device. The device can remove the one or more SVs from an SV list comprising the plurality of SVs to generate an updated SV list. The device can determine the one or more positions for the device based on measurements of signals from SVs in the updated SV list and the current external positioning assistance data.

20 Claims, 10 Drawing Sheets

200

230

Location Server

210

5GC

C-plane

214

U-plane

212

215

215

213

213

220

New RAN

223 ng-eNB

224 gNB

222

120

184

204

250

270

LMF

272

SLP

260

5GC

266

264

AMF

SMF

UPF

262

265

265

263

263

220

NEW RAN

224 ng-eNB gNB

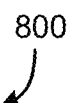

800

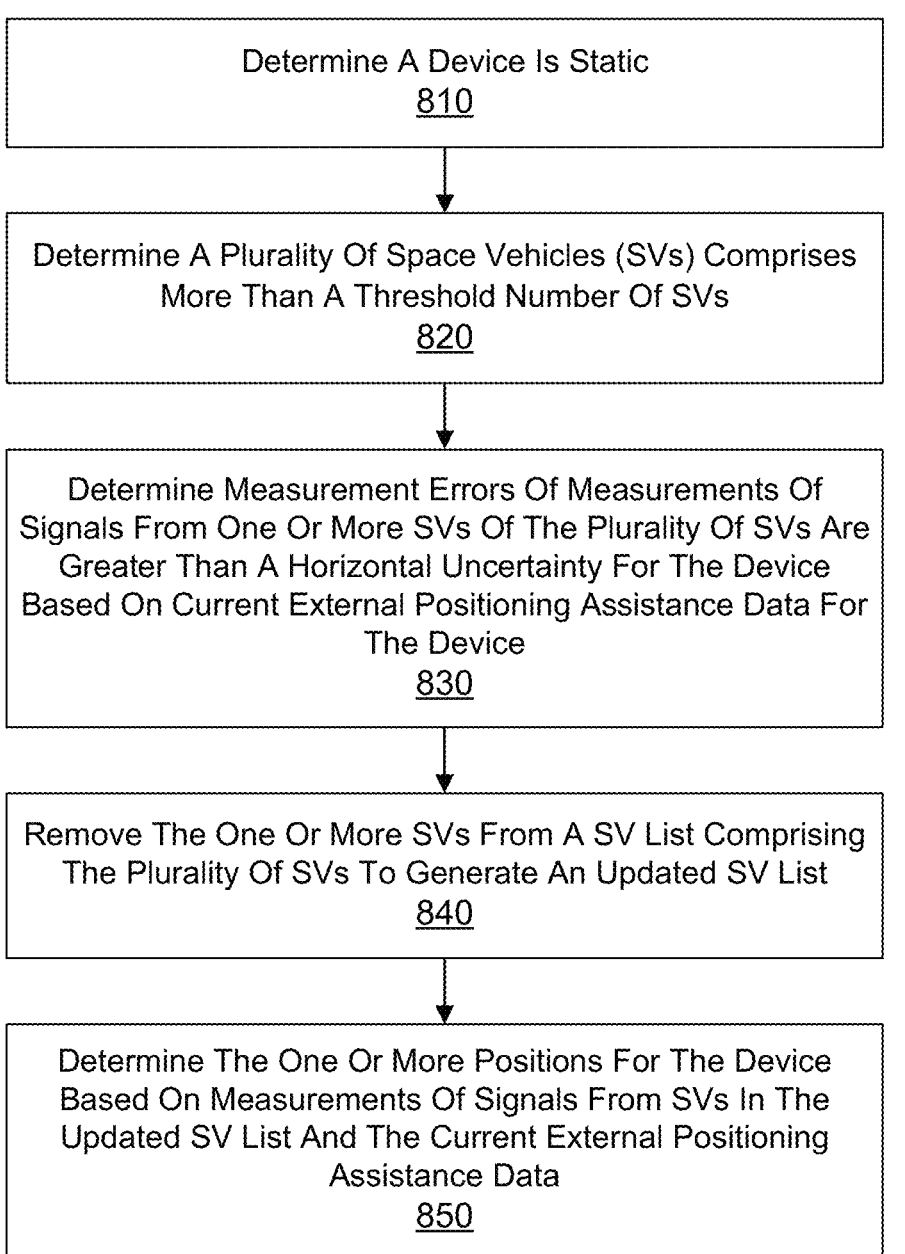

Determine A Device Is Static
810

Determine A Plurality Of Space Vehicles (SVs) Comprises
More Than A Threshold Number Of SVs
820

Determine Measurement Errors Of Measurements Of
Signals From One Or More SVs Of The Plurality Of SVs Are
Greater Than A Horizontal Uncertainty For The Device
Based On Current External Positioning Assistance Data For
The Device
830

Remove The One Or More SVs From A SV List Comprising
The Plurality Of SVs To Generate An Updated SV List
840

Determine The One Or More Positions For The Device
Based On Measurements Of Signals From SVs In The
Updated SV List And The Current External Positioning
Assistance Data
850

FIG. 8

ENHANCED POSITIONING FOR LOCATION SERVICES

FIELD

The present disclosure generally relates to wireless positioning. For example, aspects of the present disclosure relate to enhanced positioning of a device (e.g., for emergency location services).

BACKGROUND

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods and computer-readable media for enhanced positioning of a device (e.g., for emergency location services). According to at least one example, an apparatus for determining one or more positions of a device is provided. The apparatus includes at least one memory and at least one processor coupled to the at least one memory and configured to: determine the device is static; determine a plurality of space vehicles (SVs) comprises more than a threshold number of SVs; determine measurement errors of measurements of signals from one or more SVs of the plurality of SVs are greater than a horizontal uncertainty for the device based on current external positioning assistance data for the device; remove the one or more SVs from an SV list comprising the plurality of SVs to generate an updated SV list; and determine the one or more positions for the device based on measurements of signals from SVs in the updated SV list and the current external positioning assistance data.

In another example, a method is provided for determining one or more positions of a device. The method includes: determining, by one or more processors, the device is static; determining, by the one or more processors, a plurality of space vehicles (SVs) comprises more than a threshold number of SVs; determining, by the one or more processors, measurement errors of measurements of signals from one or more SVs of the plurality of SVs are greater than a horizontal uncertainty for the device based on current external positioning assistance data for the device; removing, by the one or more processors, the one or more SVs from an SV list comprising the plurality of SVs to generate an updated SV list; and determining, by the one or more processors, the one or more positions for the device based on measurements of signals from SVs in the updated SV list and the current external positioning assistance data.

In another example, a non-transitory computer-readable medium is provided having stored thereon instructions that, when executed by at least one processor, cause the at least one processor to: determine a device is static; determine a plurality of space vehicles (SVs) comprises more than a threshold number of SVs; determine measurement errors of measurements of signals from one or more SVs of the plurality of SVs are greater than a horizontal uncertainty for the device based on current external positioning assistance data for the device; remove the one or more SVs from an SV list comprising the plurality of SVs to generate an updated SV list; and determine the one or more positions for the device based on measurements of signals from SVs in the updated SV list and the current external positioning assistance data.

In another example, an apparatus is provided that includes: means for determining the device is static; means for determining a plurality of space vehicles (SVs) comprises more than a threshold number of SVs; means for determining measurement errors of measurements of signals from one or more SVs of the plurality of SVs are greater than a horizontal uncertainty for the device based on current external positioning assistance data for the device; means for removing the one or more SVs from an SV list comprising the plurality of SVs to generate an updated SV list; and means for determining the one or more positions for the device based on measurements of signals from SVs in the updated SV list and the current external positioning assistance data.

Aspects generally include a method, apparatus, system, computer program product, non-transitory computer-readable medium, user equipment, base station, wireless communication device, and/or processing system as substantially described herein with reference to and as illustrated by the drawings and specification.

In some aspects, one or more of the apparatuses described herein is or is part of a vehicle, a mobile device (e.g., a mobile telephone or so-called "smart phone" or other mobile device), a wearable device, an extended reality device (e.g., a virtual reality (VR) device, an augmented reality (AR)

device, or a mixed reality (MR) device), a personal computer, a laptop computer, a server computer, or other device. In some aspects, the one or more apparatuses includes a camera or multiple cameras for capturing one or more images. In some aspects, the one or more apparatuses further includes a display for displaying one or more images, notifications, and/or other displayable data. In some aspects, the one or more apparatuses described above can include one or more sensors, which can be used for determining a location of the apparatus(es), a state of the apparatus(es) (e.g., a temperature, a humidity level, and/or other state), and/or for other purposes.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures:

FIG. 2A and FIG. 2B illustrate examples of wireless network structures, according to aspects of the disclosure.

FIG. 8 is a flow diagram illustrating an example of a process for wireless positioning, according to aspects of the disclosure.

DETAILED DESCRIPTION

Figure 1:
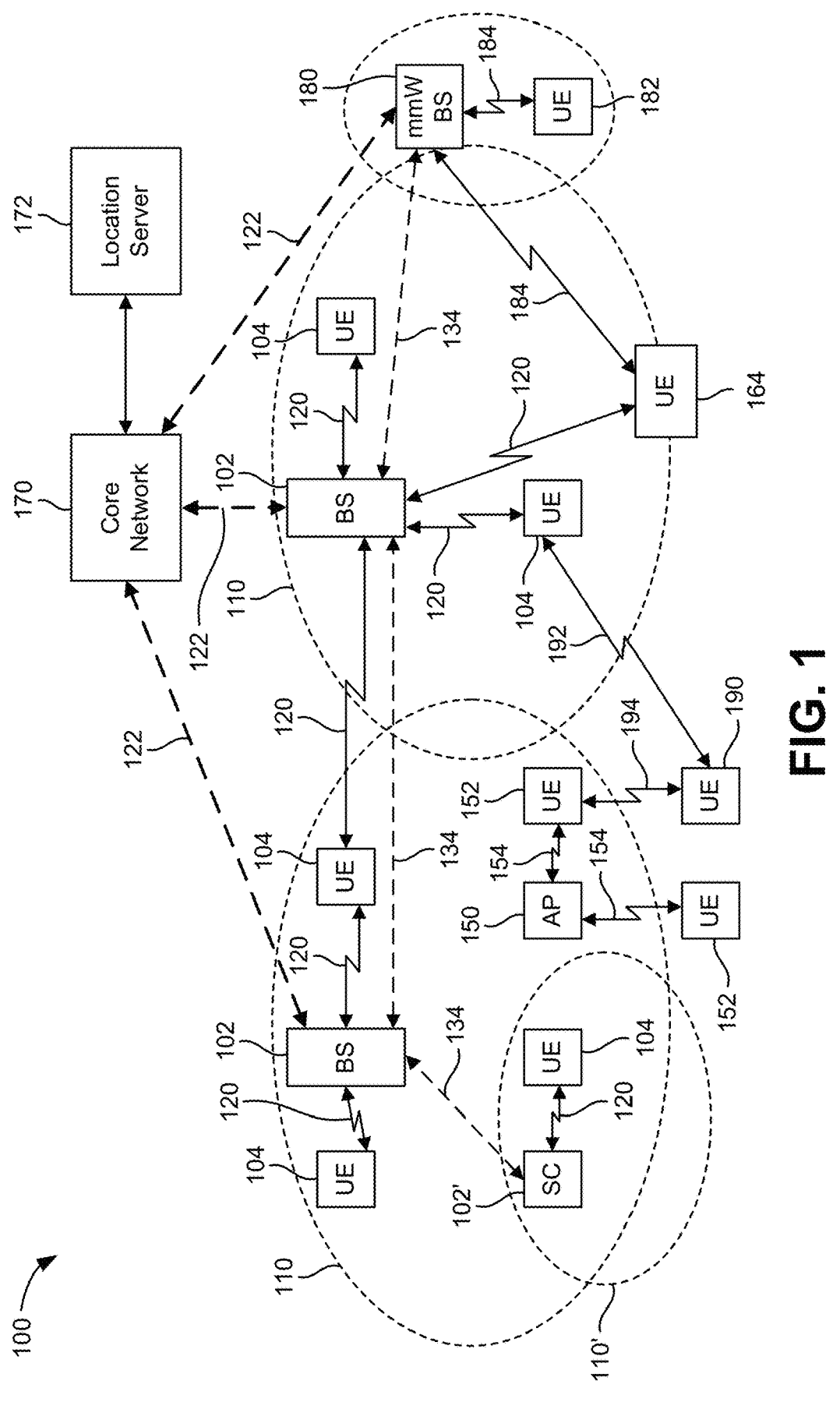
FIG. 1 illustrates an exemplary wireless communications system, according to aspects of the disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

In general, wireless communications systems support communication with multiple devices by sharing the available system resources (e.g., time, frequency, and power). As noted above, examples of cellular systems that provide such multiple-access support include code division multiple access (CDMA) systems, time division multiple access (TDMA) systems, frequency division multiple access (FDMA) systems, and orthogonal frequency-division multiple access (OFDMA) systems. A wireless multiple-access communications system may include a number of base stations, each simultaneously supporting communication for multiple communication devices, which may be otherwise known as user equipment (UE).

Wireless communication devices, such as UEs, often utilize measurements obtained from signals received from space vehicles (SVs) (also referred to as satellite vehicles), such as Global Navigation Satellite System (GNSS) satellites, for geolocation (e.g., to determine a position estimate) of the devices. When a device is located within a challenged GNSS environment, such as an urban environment, the position estimate for the device can be adversely affected. For example, during location services, such as emergency location services (e.g., enhanced 911 (E911) sessions), in a static scenario (e.g., when the device is static), when the device is located within an urban environment (e.g., with many GNSS signals available for measurement), high-rise buildings located in proximity to the device can cause the GNSS measurements obtained by the device to have large measurement errors. Due to these large measurement errors in the GNSS measurements, the position estimate of the device can converge to a position with a large position error and low uncertainty (e.g., the uncertainty of the position estimate is low because many GNSS measurements are used to determine the position estimate). For a positioning session (e.g., an E911 session), an inaccurate position estimate for the device can impact the user experience (e.g., in case of a critical or emergency situation), and can cause the user to be incorrectly located to a wrong position.

In some cases, external coarse position assistance (e.g., external positioning assistance data for the device) injected by an application processor (AP) with a high or medium reliability with a low horizontal uncertainty can be used in conjunction with GNSS measurements to determine the position estimate for the device. The external coarse position assistance (e.g., external positioning assistance data for the device) can be obtained by one or more sensors (e.g., one or more terrestrial sensors, which may be implemented on buildings or vehicles) located in close proximity to the device. When many GNSS measurements are used to obtain the position estimate for the device, the uncertainty of the position estimate is low and, as such, the external coarse position assistance is typically not used. Determining the position estimate using GNSS measurements with large measurement errors, without the aid of the external coarse position assistance, can cause a degradation in the positioning accuracy and performance. As such, a technique for enhanced positioning of a device can be beneficial, such as for emergency location services or other services.

In one or more aspects of the present disclosure, systems, apparatuses, methods (also referred to as processes), and computer-readable media (collectively referred to herein as "systems and techniques") are described herein that provide solutions for enhanced positioning of a device (e.g., for emergency location services, mapping services, or other services). In one or more examples, the systems and techniques can provide a more accurate position estimate of a device by removing GNSS measurements with large measurement errors from the GNSS measurements used for the positioning solution. In some examples, external coarse positioning assistance data can be utilized to aid the positioning solution.

In one or more examples, during operation of the system for determining one or more positions of a device, one or more processors can determine that the device is static (e.g., not moving) by determining that the horizontal speed (HSpeed) of the device is equal to approximately zero using (e.g., based on) GNSS measurements from a plurality of SVs. In some examples, the one or more processors can determine that the device is static by determining that current external coarse positioning assistance data, which can include the location (e.g., latitude, longitude, and altitude) and horizontal uncertainty (HUNC) for the device, is within a threshold difference from (e.g., the same or similar to) previous external coarse positioning assistance data for the device (e.g., the external coarse positioning assistance data determined just prior to the current external coarse positioning assistance data). In one or more examples, one or more processors can determine that the device is static by determining that a respective elevation and azimuth of each SV in the plurality of SVs changed by less than a threshold number of degrees (e.g., two or three degrees), after a predetermined amount of time has passed, such as a five minutes.

In some examples, during operation of the system, the one or more processors can determine that the plurality of SVs includes more than a threshold number (e.g., four) of SVs. In one or more examples, the one or more processors can determine that measurement errors of measurements of signals from one or more SVs of the plurality of SVs are greater than a horizontal uncertainty for the device based on the current external positioning assistance data for the device. In some examples, the one or more processors can then remove the one or more SVs form an SV list including the plurality of SVs to generate an updated SV list. In one or more examples, the one or more processors can determine the one or more positions of the device by using (e.g., based on) measurements of signals from SVs in the updated SV list and the current external positioning assistance data.

In one or more aspects, the systems and techniques can provide an improvement in positioning performance in GNSS challenged environments (e.g., urban environments). This improvement can be helpful for various location or positioning services, such as emergency location services, mapping services, or other use cases to accurately locate a user associated with a device in critical and emergency situations.

Further aspects of the systems and techniques will be described with respect to the figures.

As used herein, the term "communication unit" is a system, device, or component of a UE that can include a telematics control unit (TCU), a network access device (NAD), a modem, a subscriber identity module (SIM), a transceiver (or individual receiver and/or transmitter), any combination thereof, and/or other system, device, or component configured to perform wireless communication operations.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable device (e.g., smart watch, glasses, an extended reality (XR) device such as a virtual reality (VR) headset, an augmented reality (AR) headset or glasses, or a mixed reality (MR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "user device," a "user terminal" or UT, a "client device," a "wireless device," a "subscriber device," a "subscriber terminal," a "subscriber station," a "mobile device," a "mobile terminal," a "mobile station," or variations thereof. Generally, UEs can communicate with a core network via a RAN, and through the core network the UEs can be connected with external networks such as the Internet and with other UEs. UEs can also communicate with other UEs and/or other devices as described herein. In some cases, other mechanisms of connecting to the core network, the Internet, and other UEs are also possible for the UEs, such as over wired access networks, wireless local area network (WLAN) networks (e.g., based on IEEE 802.11, based on ultra-wideband (UWB), etc.), and so on.

A base station may operate according to one of several RATs in communication with UEs, road side units (RSUs), and/or other devices, depending on the network in which it is deployed. In some cases, a base station may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A road side unit (RSU) is a device that can transmit and receive messages over a communications link or interface (e.g., a cellular-based sidelink or PC5 interface, an 802.11 or WiFi™ based Dedicated Short Range Communication (DSRC) interface, and/or other interface) to and from one or more UEs, other RSUs, and/or base stations. An example of messages that can be transmitted and received by an RSU includes vehicle-to-everything (V2X) messages, which are described in more detail below. RSUs can be located on various transportation infrastructure systems, including roads, bridges, parking lots, toll booths, and/or other infrastructure systems. In some examples, an RSU can facilitate communication between UEs (e.g., vehicles, pedestrian user devices, and/or other UEs) and the transportation infrastructure systems. In some implementations, a RSU can be in communication with a server, base station, and/or other system that can perform centralized management functions.

An RSU can communicate with a communications system of a UE. For example, an intelligent transport system (ITS) of a UE (e.g., a vehicle and/or other UE) can be used to generate and sign messages for transmission to an RSU and to validate messages received from an RSU. An RSU can communicate (e.g., over a PC5 interface, DSRC interface, etc.) with vehicles traveling along a road, bridge, or other infrastructure system in order to obtain traffic-related data (e.g., time, speed, location, etc. of the vehicle). In some cases, in response to obtaining the traffic-related data, the RSU can determine or estimate traffic congestion information (e.g., a start of traffic congestion, an end of traffic congestion, etc.), a travel time, and/or other information for a particular location. In some examples, the RSU can communicate with other RSUs (e.g., over a PC5 interface, DSRC interface, etc.) in order to determine the traffic-related data. The RSU can transmit the information (e.g., traffic congestion information, travel time information, and/or other information) to other vehicles, pedestrian UEs, and/or other UEs. For example, the RSU can broadcast or otherwise transmit the information to any UE (e.g., vehicle, pedestrian UE, etc.) that is in a coverage range of the RSU.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an example of a wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a 4G/LTE network, or gNBs where the wireless communications system 100 corresponds to a 5G/NR network, or a combination of both, and the small cell base stations may include femtocells, picocells, microcells, etc.

The base stations 102 may collectively form a RAN and interface with a core network 170 (e.g., an evolved packet core (EPC) or a 5G core (5 GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5 GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. In some cases, mmW frequencies can be referred to as the FR2 band (e.g., including a frequency range of 24250 MHz to 52600 MHz). In some examples, the wireless communications system 100 can include one or more base stations (referred to herein as "hybrid base stations") that operate in both the mmW frequencies (and/or near mmW frequencies) and in sub-6 GHz frequencies (referred to as the FR1 band, e.g., including a frequency range of 450 to 6000 MHz).

Communications using the mmW/near mmW radio frequency band have high path loss and a relatively short range. The mmW base station 180, one or more hybrid base stations (not shown), and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, UWB, and so on.

Figure 2A:
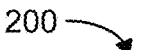

According to various aspects, FIG. 2A illustrates an example wireless network structure 200. For example, a 5 GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5 GC 210 and specifically to the control plane functions 214 and user plane functions 212. In an additional configuration, an ng-eNB 224 may also be connected to the 5 GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1).

Another optional aspect may include location server 230, which may be in communication with the 5 GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5 GC 210, and/or via the Internet (not illustrated). Further, the location server 230 may be integrated into a component of the core network, or alternatively may be external to the core network. In some examples, the location server 230 can be operated by a carrier or provider of the 5 GC 210, a third party, an original equipment manufacturer (OEM), or other party. In some cases, multiple location servers can be provided, such as a location server for the carrier, a location server for an OEM of a particular device, and/or other location servers. In such cases, location assistance data can be received from the location server of the carrier and other assistance data can be received from the location server of the OEM.

Figure 2B:
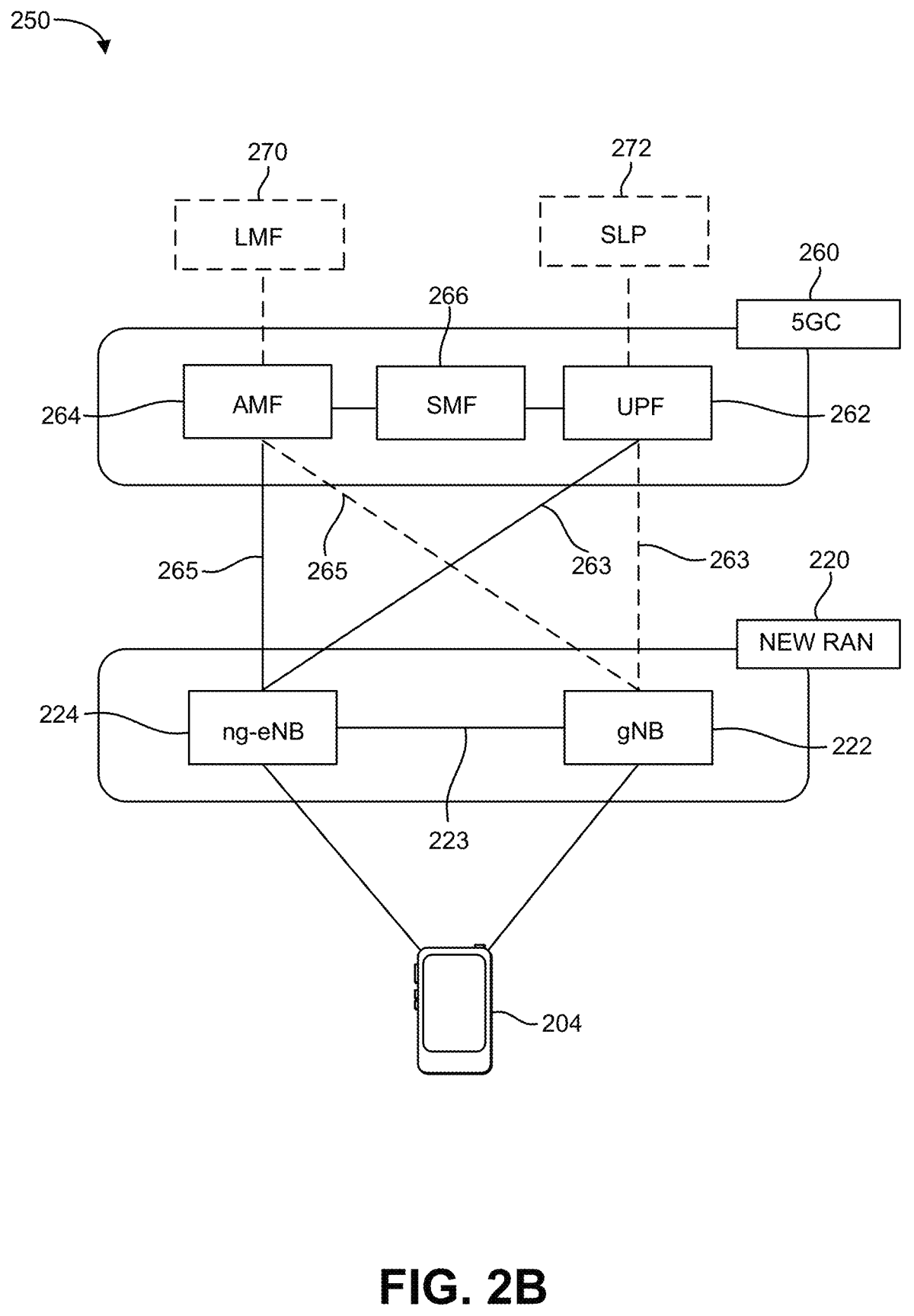

According to various aspects, FIG. 2B illustrates another example wireless network structure 250. For example, a 5 GC 260 can be viewed functionally as control plane functions, provided by an access and mobility management function (AMF) 264, and user plane functions, provided by a user plane function (UPF) 262, which operate cooperatively to form the core network (i.e., 5 GC 260). User plane interface 263 and control plane interface 265 connect the ng-eNB 224 to the 5 GC 260 and specifically to UPF 262 and AMF 264, respectively. In an additional configuration, a gNB 222 may also be connected to the 5 GC 260 via control plane interface 265 to AMF 264 and user plane interface 263 to UPF 262. Further, ng-eNB 224 may directly communicate with gNB 222 via the backhaul connection 223, with or without gNB direct connectivity to the 5 GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5 GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5 GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated with (e.g., part of or co-located with) a base station, such as the gNB 222 and/or the ng-eNB 224. When integrated with the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5 GC 260) and the case in which the LMF 270 and the SLP 272 are components of or co-located with a base station.

Figure 3:
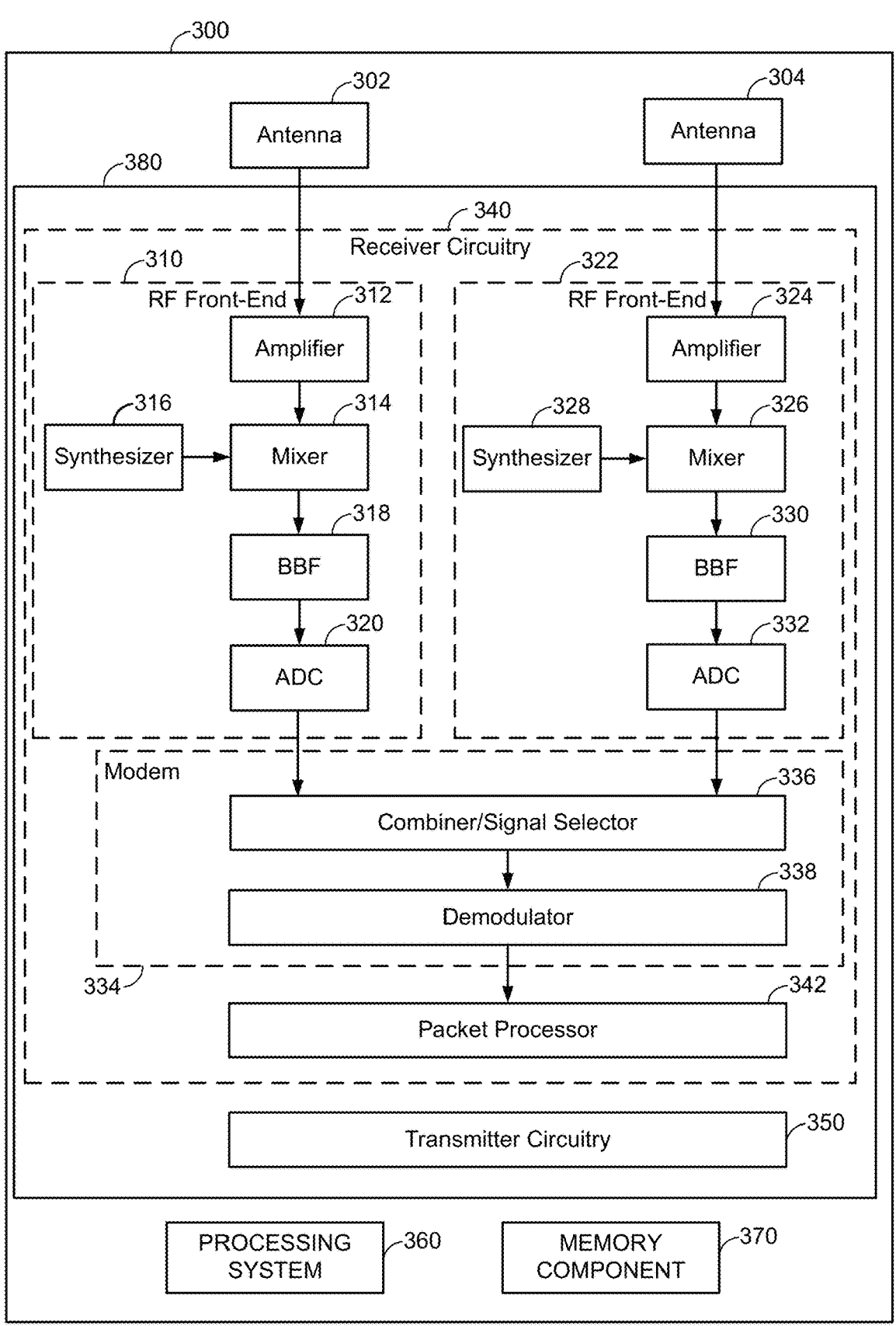
FIG. 3 is a block diagram illustrating an example of user equipment (UE), according to aspects of the disclosure.

FIG. 3 illustrates an example of an architecture of a UE 300 having a transceiver 380 capable of implementing carrier aggregation, according to at least one aspect of the disclosure. The transceiver 380 may be coupled to first and second antennas 302 and 304.

The transceiver 380 includes receiver circuitry 340 and transmitter circuitry 350. While the transceiver 380 is shown to include a combination of receiver circuitry 340 and transmitter circuitry 350, in some cases the transceiver 380 can include transmitter circuitry only (without receiver circuitry) or receiver circuitry only (without transmitter circuitry). In some implementations, the transceiver 380 can include a plurality of transmitters, a plurality of receivers, or any combination thereof.

The receiver circuitry 340 is capable of implementing carrier aggregation. As such, in the example of FIG. 3, the receiver circuitry 340 includes a radio frequency (RF) front-end 310 and an RF front-end 322 coupled to the two antennas 302 and 304, respectively. Note that although FIG. 3 illustrates only two antennas 302 and 304 and two RF front-ends 310 and 322, as will be appreciated, there may be more or less than two antennas and more or less than two RF front-end. The transmitter circuitry 350 may also be capable of implementing carrier aggregation similarly to the receiver circuitry 340, which is not shown in FIG. 3 for the sake of simplicity.

A transceiver (e.g., transceiver 380) generally includes a baseband portion (e.g., including modem 334, packet processor 342, and/or part of the processing system 360) and an RF front-end (e.g., RF front-end 310 and/or RF front-end 322). The RF front-end, broadly speaking, handles selection and conversion of the RF signals into the baseband or intermediate frequency and converts the RF signals to the digital domain. The baseband portion can include the remainder of the transceiver.

Referring to FIG. 3, the RF front-end 310 includes an amplifier 312, a mixer 314 (also referred to as a signal multiplier) for signal down conversion, a frequency synthesizer 316 (also referred to as an oscillator) that provides signals to the mixer 314, a baseband filter (BBF) 318, and an analog-to-digital converter (ADC) 320. Similarly, the RF front-end 322 includes an amplifier 324, a mixer 326, a frequency synthesizer 328, a BBF 330, and an ADC 332. The ADCs 320 and 332 are coupled to and can provide digital data to the signal combiner/signal selector 336 of the modem 334, which is coupled to the demodulator 338 of the modem 334. The demodulator 338 is coupled to a packet processor 342. The demodulator 338 and the packet processor 342 provide demodulated and processed single or multiple output signals to the communication controller and/or processing system 360.

UE 300 further includes a processing system 360 that may direct operations of its respective systems. In an aspect, the processing system 360 may include, for example, one or more general purpose processors, multi-core processors, application specific integrated circuits (ASICs), digital signal processors (DSPs), field programmable gate arrays (FPGA), application processors (AP), sensor processors, and/or other programmable logic devices or processing circuitry. In some examples, the baseband portion of the transceiver can include all or part of the processing system 360. For instance, the baseband portion can include the AP, sensor processors, and/or other processors of the processing system 360. Additionally, a memory component 370 can provide storage for program codes and data used by the processing system 360 and/or the transceiver 380. For example, the memory component 370 may include instructions that, when executed by the processing system 360 and/or transceiver 380, cause the UE 300 to perform the operations described herein. In an aspect, the processing system 360 may be an ASIC, or other processor, microprocessor, logic circuit, or other data processing device. In an aspect, the memory component 370 may be random access memory (RAM), flash memory, read-only memory (ROM), erasable programmable ROM (EPROM), electrically erasable programmable ROM (EEPROM), registers, hard disk, a removable disk, or any other form of storage medium known in the art.

In some examples, the receiver circuitry 340 receives a signal through the antennas 302 and 304. The receiver circuitry 340 recovers information modulated onto an RF component carrier and provides the information to the processing system 360. The receiver circuitry 340 implements Layer-1 functionality associated with various signal processing functions. The receiver circuitry 340 may perform spatial processing on the information to recover any spatial streams destined for the UE 300. If multiple spatial streams are destined for the UE 300, they may be combined by the receiver circuitry 340 into a single orthogonal frequency division multiplexing (OFDM) symbol stream (e.g., by signal combiner/signal selector 336). The receiver circuitry 340 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated (e.g., by the demodulator 338) by determining the most likely signal constellation points transmitted by the base station (e.g., base station 102). These soft decisions may be based on channel estimates computed by a channel estimator (not shown). The soft decisions are then decoded and de-interleaved to recover the data and control signals that were originally transmitted by the base station on the physical channel. The data and control signals are then provided to the processing system 360, which implements Layer-3 and Layer-2 functionality.

Referring to the processing system 360 in more detail, the processing system 360 may implement functionality for a radio resource control (RRC) layer, a packet data convergence protocol (PDCP) layer, a radio link control (RLC) layer, and a medium access control (MAC) layer. The processing system 360 provides RRC layer functionality associated with system information (e.g., master information block (MIB), system information blocks (SIBs)) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through automatic repeat request (ARQ), concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Note that not every component illustrated in FIG. 3 is required for the operation of the system. For example, in direct RF-to-baseband conversion receivers, or any other direct conversion receivers, including certain software-defined radio (SDR) implementations, various components of the receiver circuitry 340 are not necessary, as is known in the art. In addition, while FIG. 3 illustrates a single modem 334 coupled to two RF front-ends 310 and 322, as will be appreciated, each RF front-end 310 and 322 may be coupled to a different modem, in which case the receiver circuitry 340 can include the same number of RF front-ends and modems. Further, while FIG. 3 illustrates integrated transmitter circuitry 350 and receiver circuitry 340, i.e., transceiver 380, in some implementations, the UE 300 may comprise a separate transmitter device and a separate receiver device, as noted above.

As previously mentioned, wireless communication devices (e.g., UEs) usually use measurements obtained from signals received from SVs (e.g., GNSS satellites) for geo-location (e.g., to determine a position estimate) of the devices. When a device is located within a challenged GNSS environment (e.g., an urban environment), the position estimate for the device may be adversely affected. For example, during location or positioning sessions (e.g., emergency location services sessions (E911) sessions), in a static scenario (e.g., when the device is static), when the device is located within an urban environment where many GNSS signals available for measurement, high-rise buildings located in proximity to the device can cause the GNSS measurements obtained by the device to have large measurement errors. Due to these large measurement errors in the GNSS measurements, the position estimate of the device can converge to a position with a large position error and low uncertainty (e.g., due to the many GNSS measurements used to determine the position estimate). For positioning sessions (e.g., E911 sessions), an inaccurate position estimate for the device can cause the user to be incorrectly located to a wrong position during a critical or emergency situation.

External coarse position assistance (e.g., external positioning assistance data for the device, also referred to as an external position injection (EPI)) injected by an AP with a high or medium reliability with a low horizontal uncertainty can be used along with GNSS measurements to determine the position estimate for the device. The external coarse position assistance can be obtained by one or more sensors located in close proximity to the device. In one or more examples, the one or more sensors may be one or more terrestrial sensors, which may be implemented on buildings or vehicles. The one or more sensors may be in the form of radar sensors and/or light detection and ranging (LiDAR) sensors.

When many GNSS measurements are used to obtain the position estimate for the device, the uncertainty of the position estimate is low and, thus, the external coarse position assistance is generally not used. Determining the position estimate using GNSS measurements with large measurement errors, without the aid of the external coarse position assistance, can cause a degradation in the positioning accuracy and performance.

Figure 4:
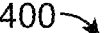
FIG. 4 is as diagram illustrating examples of different estimated positions for a location of a device within an environment, according to aspects of the disclosure.

FIG. 4 is as diagram illustrating examples of different estimated positions (e.g., Position B and Position C) for a location (e.g., Position A) of a device (e.g., a UE, such as a smartphone) within an environment. FIG. 4 shows a depiction of an environment 400. The environment 400 is an urban environment including many high rise buildings. The high rise buildings in the environment 400 can obstruct the propagation of signals transmitted from SVs (e.g., GNSS satellites) and create multipath. As such, the environment 400 is a challenged GNSS environment.

During operation for positioning of the device, one or more sensors (e.g., antennas) on the device can receive signals (e.g., RF signals) transmitted from a plurality of SVs (e.g., GNSS satellites) orbiting above the environment 400. The device can obtain measurements from the received signals (e.g., SV signals). One or more processors of the device can determine a position estimate for the device by using (e.g., based on) the measurements of the signals. In one or more examples, since the environment 400 is a challenged GNSS environment, some of the measurements of the signals can have large measurement errors. These large measurement errors can cause the determined position estimate to be greatly inaccurate.

In one or more examples, one or more sensors (e.g., radar sensors or LiDAR) sensors may be incorporated within buildings, structures, and/or vehicles within the environment 400. The one or more sensors can obtain measurements of signals from (e.g., reflected off of) the device. These measurements can be used to determine external coarse position assistance (e.g., external positioning assistance data for the device, also referred to as EPI), which may include an estimated location (e.g., latitude, longitude, and altitude) and horizontal uncertainty (HUNC) for the device.

In FIG. 4, a user associated with the device is located at Position A in the environment 400. As such, position A is the truth location (e.g., the real location) for the device. Position B in the environment 400 is a position estimate for the device based on the external coarse position assistance (e.g., external positioning assistance data for the device, also referred to as EPI) injected by an AP with a high or medium reliability with a low horizontal uncertainty. Position C in the environment 400 is a position estimate for the device based on the measurements of the signals from the SVs. However, since the environment 400 is a challenged GNSS environment, some of the measurements of the signals have large measurement errors and, as such, Position C is located far away from Position A (e.g., the truth location). As shown in FIG. 4, Position B is located closer to Position A (e.g., the truth location) than Position C.

Figure 5:
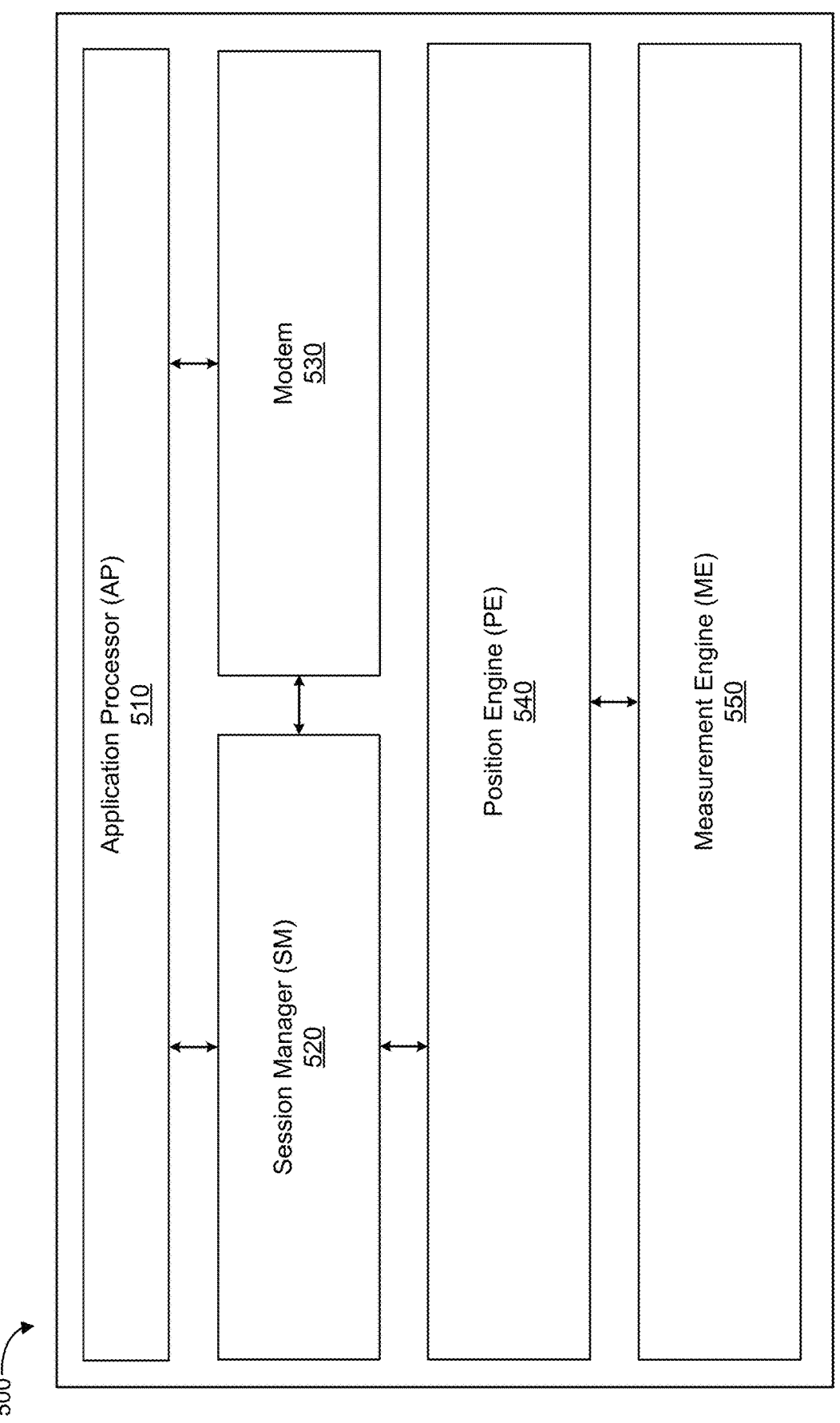
FIG. 5 is a diagram illustrating an example of system architecture for positioning a device using measurements from space vehicles (SVs), according to aspects of the disclosure.

FIG. 5 is a diagram illustrating an example of system architecture 500 for positioning a device using measurements from SVs. In one or more examples, the system architecture 500 may be implemented within a device (e.g., a UE, such as in the form of a smartphone). In FIG. 5, the system architecture 500 is shown to include an application processor (AP) 510, a session manager (SM) 520, a modem 530 (e.g., 3G, 4G, or 5G modem), a position engine (PE) 540, and a management engine (ME) 550.

In one or more examples, the AP 510 can interact with the SE 520 and the modem 530. In some examples, the SM 520 and the modem 520 can interact with each other. The SM 520 can interact with the PE 540, and the PE 540 can interact with the ME 550.

During operation of the system architecture 500 for positioning of the device, the ME 550 performs measurements of signals received from SVs (e.g., GNSS satellites). In one or more examples, the ME 550 can start a GNSS receiver within the device to search for signals transmitted from SVs orbiting above the device. The ME 550 can receive the signals transmitted from the SVs, and can obtain measurements (e.g., GNSS measurements) from the signals received from the SVs. The ME 550 can then generate a measurement report including the measurements from the signals (e.g., SV signals). The ME 550 can send (e.g., transmit) the measurement report to the PE 540. In one or more examples, the ME 550 can empty the measurement reports that are sent during a measurement outage.

After the PE 540 receives the measurement report from the ME 550, the PE 540 can compute a position for the device using (e.g., based on) the GNSS measurements within the measurement report. The PE 540 can then send the determined position fix with accuracy and reliability information to the SM 520. In one or more examples, if there are no measurements available from the ME 550 to compute the position fix for the device, then there will be no position fix for the PE 540 to report to the SM 520. Once measurements are available to the PE 540 from the ME 550, the PE 540 can compute the position fix for the device and report the position fix for the device to the SM 520.

After the SM 520 receives the position fix for the device from the PE 540, the SM 520 can qualify the position fix for the device as a final position fix for the device based on the position accuracy and position reliability. In one or more examples, if the possibility reliability is "very low", the SM 520 will not quality the position fix. The SM 520 can then report the qualified position fix to the AP 510. The SM 520 can interact with the modem 530 for session (e.g., a positioning session, such as an E911 session) related call flow. In one or more examples, when there are no GNSS measurements, the SM 520 can request assistance data (e.g., EPI) from the modem 530.

After the modem 530 receives the request from the SM 510 for assistance data (e.g., EPI), the modem 530 can use the radio resource control (RRC)/non-access stratum (NAS) layer of the 3G/4G/5G protocol to send a request to the network for assistance data using link layer discovery protocol (LLP), secure user plane location (SUPL) protocol, or radio resource location services protocol (RRLP). The modem 530 can then receive the assistance data (e.g., EPI) from the network. After receiving the assistance data from the network, the modem 530 can forward the assistance data to the SM 520 layer for further processing. After receiving the assistance data, the SM 520 can determine a high reliability position for the device using (e.g., based on) the assistance data (e.g., EPI). The SM 520 can then report the high reliability external position (e.g., based on EPI) for the device to the network.

The system architecture 500 for positioning of the device of FIG. 5 does not include a mechanism to filter out or remove any measurements that have large measurement errors. As such, the determined position fix for the device can be greatly inaccurate (e.g., in cases of a challenged GNSS environment).

Figure 6:
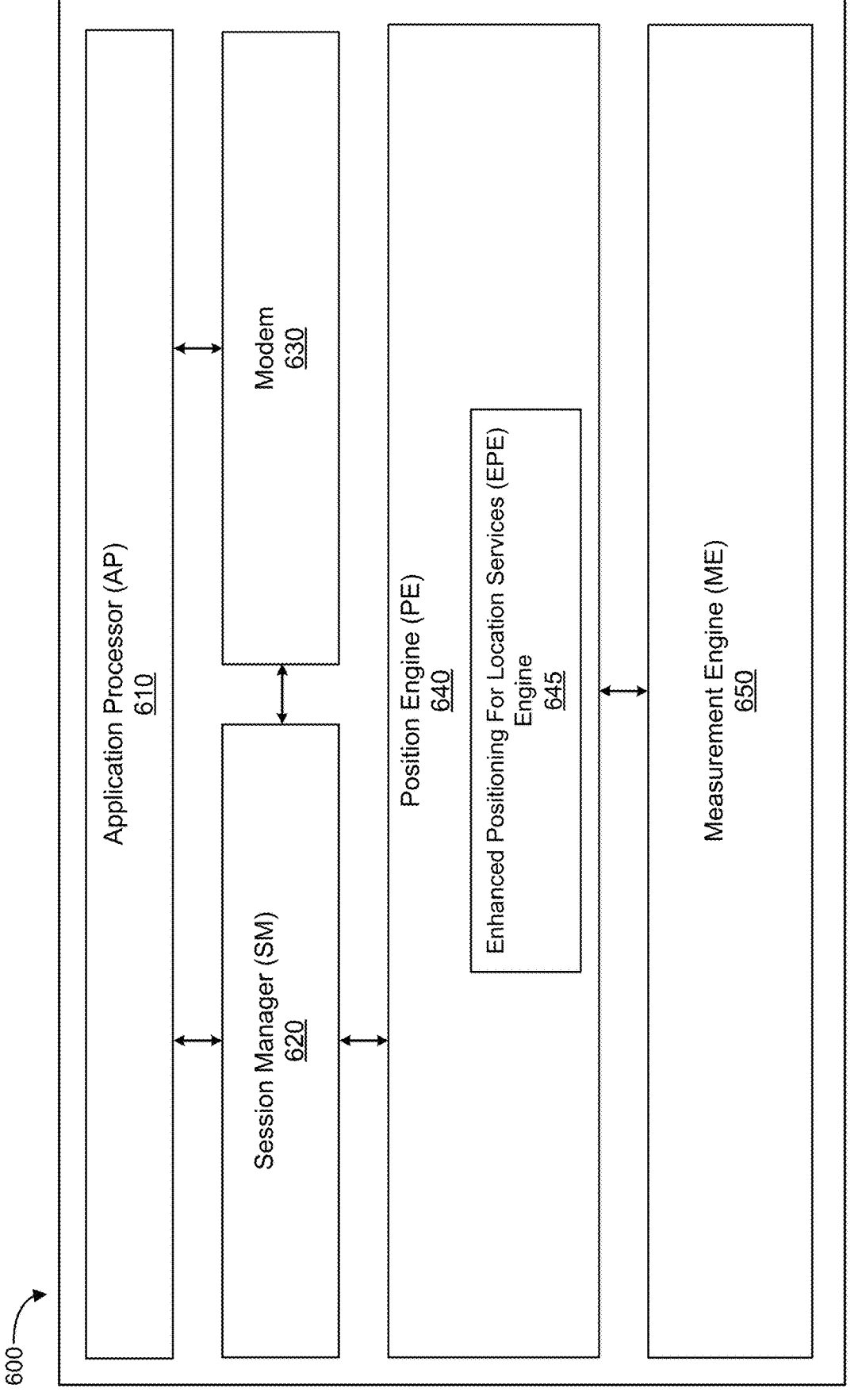
FIG. 6 is a diagram illustrating an example of system architecture for positioning a device using measurements from SVs, where the system architecture includes an enhanced positioning for emergency location services (EPE) engine implemented within a position engine (PE), according to aspects of the disclosure.

As noted previously, systems and techniques described herein provide solutions for enhanced positioning of a device (e.g., for emergency location services). FIG. 6 is a diagram illustrating an example of system architecture 600 for positioning a device using measurements from SVs, where the system architecture includes an enhanced positioning for location services (EPE) engine 645 (e.g., for emergency location services or other location services) implemented within a PE 640. In one or more examples, the system architecture 600 may be implemented within a device (e.g., a UE, such as in the form of a smartphone).

The system architecture 600 of FIG. 6 is similar to the system architecture 500 of FIG. 5, except that the system architecture 600 of FIG. 6 includes the addition of the EPE engine 645, which can remove GNSS measurements with large measurement errors from the GNSS measurements used for positioning a device. As such, the AP 510 of FIG. 5 performs similarly to the AP 610 of FIG. 6, the SM 520 of FIG. 5 performs similarly to the SM 620 of FIG. 6, the modem 530 of FIG. 5 performs similarly to the modem 630 of FIG. 6, and the ME 550 of FIG. 5 performs similarly to the ME 650 of FIG. 6.

During operation of the system architecture 600 for positioning of the device, the EPE engine 645 of the PE 640 can compute the position fix for the device. In one or more examples, the EPE engine 645 can check (e.g., confirm) if the device is static by determining that the horizontal speed (HSpeed) of the device is equal to zero (or close to zero in some cases). The EPE engine 645 can then check (e.g., confirm) if the location (e.g., latitude, longitude, and altitude) and horizontal uncertainty (HUNC) in the external coarse positioning assistance (e.g., EPI) injected by the AP 610 is static (e.g., the estimated location of the device is approximately the same as the prior epoch/injection) and there is a high or medium reliability. The EPE engine 645 can then check (e.g., determine) whether there is a change in elevation and azimuth of the SVs greater than a threshold change (e.g., a threshold number of degrees, such as by at least a few degrees), which can double confirm that the device is static for some time and the SV view has changed.

Upon receiving the measurements from the ME 650, the EPE engine 645 can check (e.g., confirm) that the number of SVs providing the signals used for measurements is greater than a threshold number of SVs (e.g., greater than four SVs or other threshold number of SVs). The EPE engine 645 can then check (e.g., determine) whether measurement errors of measurements (e.g., from non-line of sight (NLOS) signals from SVs) are greater than the HUNC (e.g., from the EPI). If the measurement errors are greater than the HUNC, the EPE engine 645 can update the SV list to remove (or discard) the SVs that are associated with measurements with large measurement errors, while ensuring that the updated SV list (e.g., new SV list) includes at least four SVs. The EPE engine 645 can then estimate the horizontal uncertainty using the new SV list, and can accept (e.g., utilize) the high/medium reliability EPI injected by the AP 610 to compute the position fix for the device. The PE 640 can then send the computed position fix for the device to the SM 620.

Figure 7:
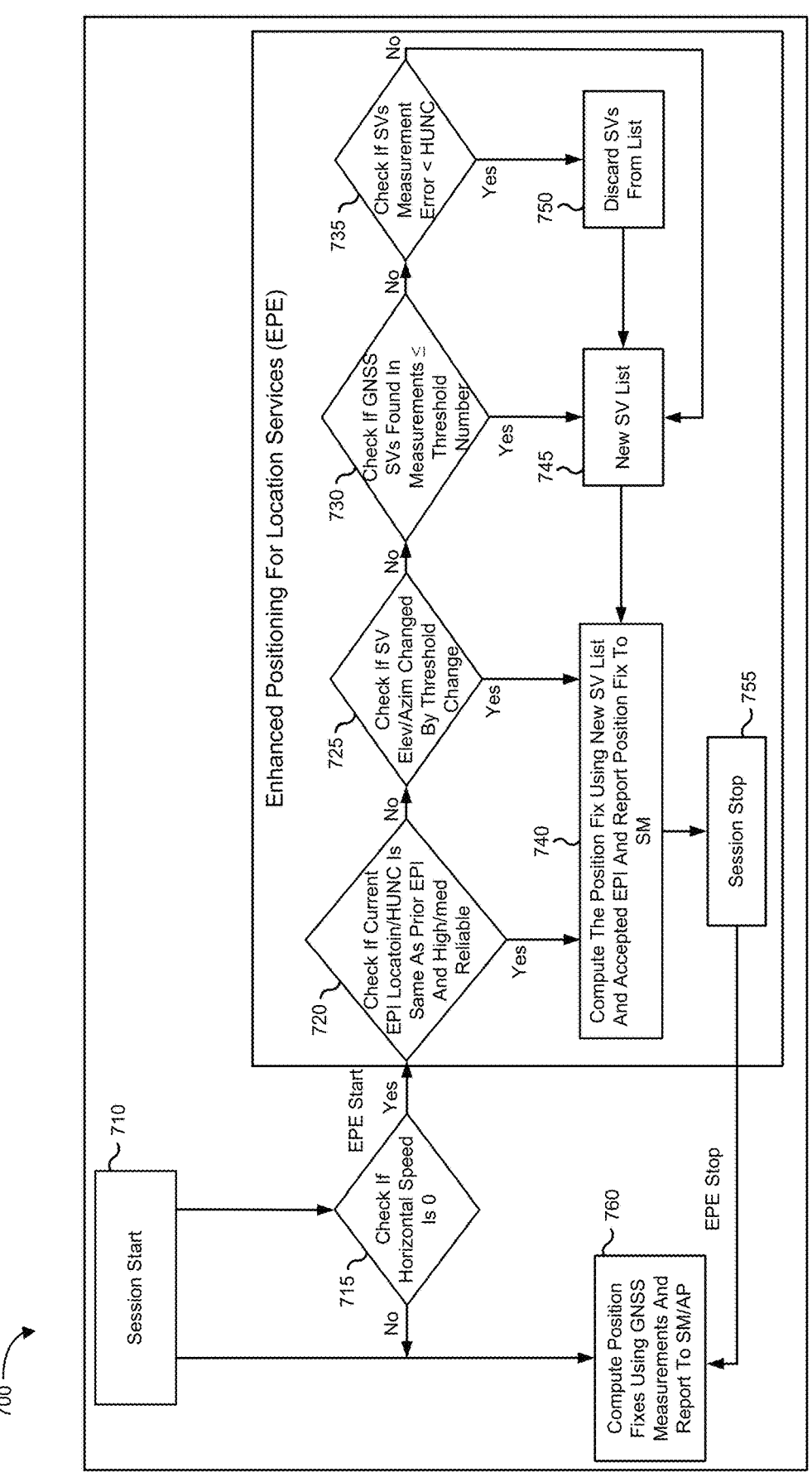
FIG. 7 is a flow diagram illustrating an example of a process for enhanced positioning for emergency location services, according to aspects of the disclosure.

FIG. 7 is a flow diagram illustrating an example of a process 700 for enhanced positioning for emergency location services. In one or more examples, the process 700 may be performed by the EPE engine 645 of the PE 640 of FIG. 6.

In one or more examples, during operation for positioning of a device, for example, at the start of a session (at block 710) (e.g., an E911 session or other session for which positioning is needed), one or more processors (e.g., of the EPE engine 645) can determine, at decision block 715, that the device is static (e.g., not moving) by determining that the horizonal speed (HSpeed) of the device is equal to approximately zero using (e.g., based on) GNSS measurements from a plurality of SVs.

When the one or more processors determine that the device is not static from decision block 715, then at block 760, the one or more processors (e.g., of the EPE engine 645) can compute one or more positions (e.g., one or more position fixes) for the device by using (e.g., based on) measurements from a plurality of SVs (e.g., GNSS satellites). The PE 640 can then report the one or more determined positions of the device to the SM 620.

However, when the one or more processors determine that the device is static from decision block 715, then at decision block 720, the one or more processors (e.g., of the EPE engine 645) can determine that the device is static (e.g., which can double confirm that the device is static) by determining that current external coarse positioning assistance data (e.g., EPI), which can include the location (e.g., latitude, longitude, and altitude) and horizontal uncertainty (HUNC) for the device, is within a threshold difference from (e.g., the same or similar to) previous external coarse positioning assistance data for the device (e.g., the external coarse positioning assistance data determined just prior to the current external coarse positioning assistance data).

When the one or more processors determine that the device is not static from decision block 720, then at decision block 725, the one or more processors (e.g., of the EPE engine 645) can determine that the device is static by determining that a respective elevation and azimuth of each SV in the plurality of SVs changed by less than a threshold change in degrees (e.g., changed by a threshold number of degrees, such as two or three degrees, or other threshold change amount), after a predetermined amount of time has passed, such as a five minutes, seven minutes, ten minutes, etc., When the one or more processors determine that the device is static from decision block 720, then the process 700 will proceed to block 740.

When the one or more processors determine that the device is not static from decision block 725, at decision block 730, the one or more processors (e.g., of the EPE engine 645) can determine that the plurality of SVs includes more than a threshold number (e.g., four, six, ten, or other threshold number) of SVs. When the one or more processors determine that the device is static from decision block 725, then the process 700 will proceed to block 740.

When the one or more processors determine that the plurality of SVs does not include more than the threshold number (e.g., four) of SVs, at decision block 735, the one or more processors (e.g., of the EPE engine 645) can determine that measurement errors of measurements of signals from one or more SVs of the plurality of SVs are greater than a horizontal uncertainty for the device based on the current external positioning assistance data for the device. When the one or more processors determine that the plurality of SVs does include more than the threshold number (e.g., four) of SVs, then the process 700 will proceed to block 745.

When the one or more processors determine that the measurement errors of measurements of signals from one or more SVs of the plurality of SVs are greater than a horizontal uncertainty for the device, at block 750, the one or more processors (e.g., of the EPE engine 645) can remove the one or more SVs form an SV list including the plurality of SVs to generate an updated SV list (e.g., a new SV list, at block 745). When the one or more processors determine that the measurement errors of measurements of signals from one or more SVs of the plurality of SVs are not greater than a horizontal uncertainty for the device, then the process 700 will proceed to block 745.

At block 740, the one or more processors (e.g., of the EPE engine 645) can determine the one or more positions (e.g., one or more position fixes) of the device by using (e.g., based on) measurements of signals from SVs in the updated SV list (e.g., the new SV list, at block 745) and the current external positioning assistance data (e.g., EPI). The PE 640 can then report the one or more determined positions of the device to the SM 620. Then, at block 755, the session (e.g., a positioning session, such as an E911 session) ends.

FIG. 8 is a flow chart illustrating an example of a process 800 for enhanced positioning for emergency location services. The process 800 can be performed by a computing device (e.g., a computing device or computing system 900 of FIG. 9) or by a component or system (e.g., a chipset, one or more processors such as one or more central processing units (CPUs), digital signal processors (DSPs), graphics processing units (GPUs), any combination thereof, and/or other type of processor(s)) of the computing device for determining one or more positions for a device. In some cases, the computing device can be the same as the device, can be part of the device (e.g., a component or system of the device), or can be separate from the device (e.g., the computing device and the device are separate devices and are not part of one another). In some aspects, the computing device can implement the EPE engine 645 of FIG. 6 to perform the process 800. The operations of the process 800 may be implemented as software components that are executed and run on one or more processors (e.g., processor 910 of FIG. 9 or other processor(s)). Further, the transmission and reception of signals by the device in the process 800 may be enabled, for example, by one or more antennas and/or one or more transceivers (e.g., wireless transceiver(s)).

At block 810, the computing device (or component thereof) can determine the device is static (e.g., at block 715, block 720, and/or block 725 of FIG. 7). In some aspects, the computing device (or component thereof) can determine a horizontal speed of the device is equal to approximately zero based on measurements of signals from the plurality of SVs (e.g., at block 715 of FIG. 7). In such aspects, the computing device (or component thereof) can determine the device is static based on determining that the horizontal speed of the device is equal to approximately zero. Additionally or alternatively, in some cases, the computing device (or component thereof) can determine that current external positioning assistance data for the device is within a threshold difference from previous external positioning assistance data for the device (e.g., at block 720 of FIG. 7). In such cases, the computing device (or component thereof) can determine the device is static based on determining the current external positioning assistance data for the device is within the threshold difference from the previous external positioning assistance data for the device. Additionally or alternatively, in some examples, the computing device (or component thereof) can determine a respective elevation and azimuth of each SV of the plurality of SVs changed by less than a threshold change (e.g., at block 725 of FIG. 7), such as less than a threshold number of degrees (e.g., two degrees, three degrees, five degrees, or other threshold number of degrees). In such examples, the computing device (or component thereof) can determine the device is static based on determining the respective elevation and azimuth of each SV changed by less than the threshold number of degrees.

At block 820, the computing device (or component thereof) can determine a plurality of space vehicles (SVs) (also referred to as satellite vehicles) includes more than a threshold number of SVs (e.g., at block 730 of FIG. 7). In some aspects, the threshold number of SVs can include four SVs, six SVs, ten SVs, or other threshold number of SVs. In some cases, each SV of the plurality of SVs is a satellite (e.g., Global Navigation Satellite System (GNSS) satellite).

At block 830, the computing device (or component thereof) can determine measurement errors of measurements of signals from one or more SVs of the plurality of SVs are greater than a horizontal uncertainty (e.g., the HUNC described herein) for the device based on the current external positioning assistance data for the device (e.g., at block 735 of FIG. 7). In some cases, the computing device (or component thereof) can obtain the current external positioning assistance data from one or more terrestrial sensors.

At block 840, the computing device (or component thereof) can remove (or discard) the one or more SVs from an SV list including the plurality of SVs (e.g., at block 750 of FIG. 7) to generate an updated SV list (e.g., the new SV list 745 of FIG. 4).

At block 850, the computing device (or component thereof) can determine the one or more positions for the device based on measurements of signals from SVs in the updated SV list and the current external positioning assistance data (e.g., at block 740 of FIG. 7). In some aspects, the computing device (or component thereof) can output a position (or multiple positions) of the device for emergency location services (e.g., e911 services) or for other services (e.g., mapping services).

In some cases, the computing device can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 800 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

Figure 9:
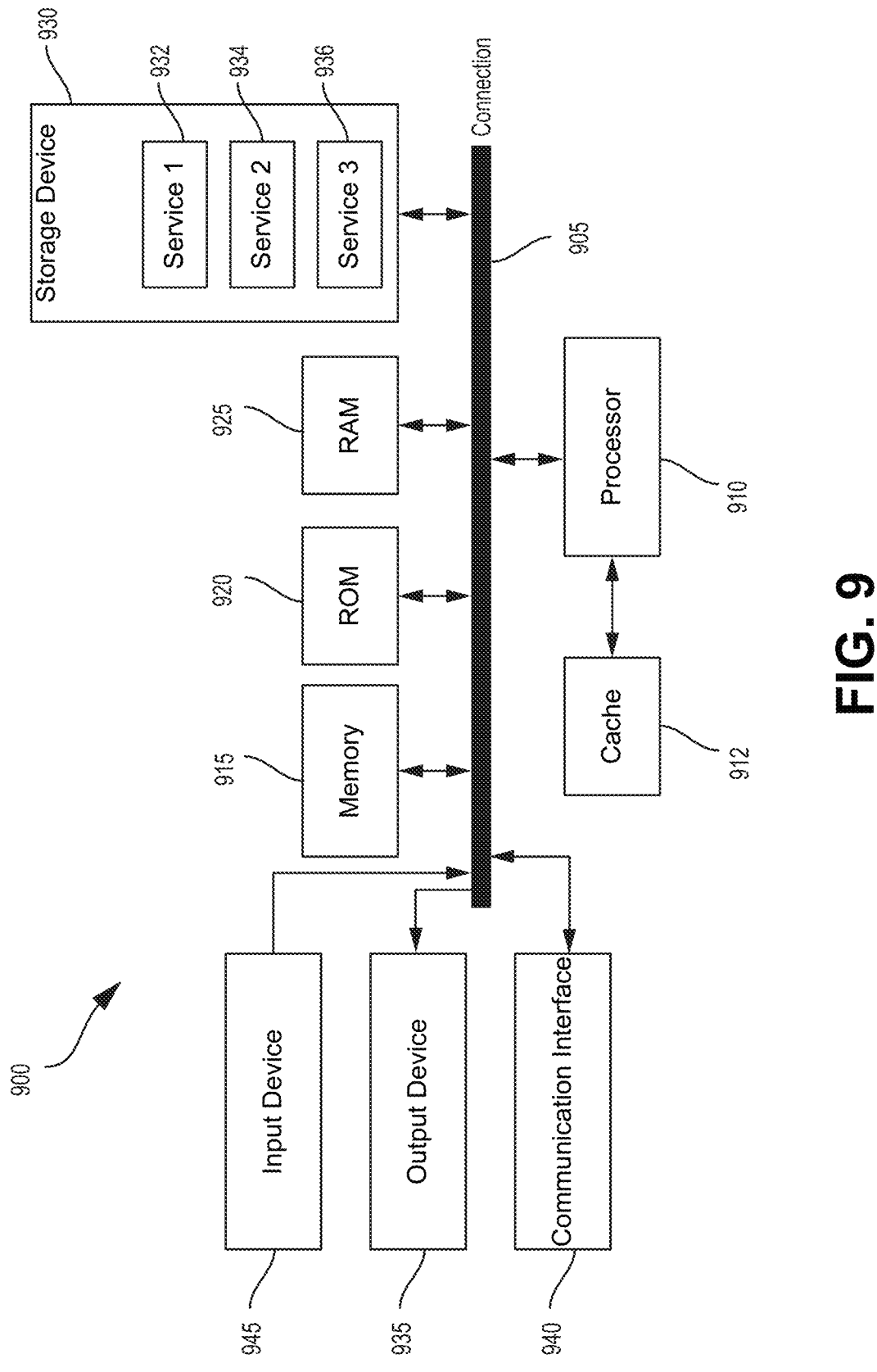
FIG. 9 is a block diagram illustrating an example of a computing system, according to aspects of the disclosure.

FIG. 9 is a block diagram illustrating an example of a computing system 900, which may be employed for enhanced positioning for emergency location services. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some aspects, computing system 900 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 900 includes at least one processing unit (CPU or processor) 910 and connection 905 that communicatively couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900.

Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 940 may also include one or more range sensors (e.g., LIDAR sensors, laser range finders, RF radars, ultrasonic sensors, and infrared (IR) sensors) configured to collect data and provide measurements to processor 910, whereby processor 910 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some aspects, a hardware service that performs a particular function can include the software component stored in a computer-readable medium in connection with the necessary hardware components, such as processor 910, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smartphones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods, algorithms, and/or operations described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference is to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the embodiments disclosed herein may be implemented as electronic hardware, computer software, firmware, or combinations thereof. To clearly illustrate this interchangeability of hardware and software, various illustrative components, blocks, engines, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as engines, modules, or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), nonvolatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative Aspects of the Disclosure Include:

Aspect 1. An apparatus for determining one or more positions of a device, the apparatus comprising: at least one memory; and at least one processor coupled to the at least one memory and configured to: determine the device is static; determine a plurality of space vehicles (SVs) comprises more than a threshold number of SVs; determine measurement errors of measurements of signals from one or more SVs of the plurality of SVs are greater than a horizontal uncertainty for the device based on current external positioning assistance data for the device; remove the one or more SVs from an SV list comprising the plurality of SVs to generate an updated SV list; and determine the one or more positions for the device based on measurements of signals from SVs in the updated SV list and the current external positioning assistance data.

Aspect 2. The apparatus of Aspect 1, wherein the at least one processor is configured to: determine a horizontal speed of the device is equal to approximately zero based on measurements of signals from the plurality of SVs; and determine the device is static based on determining that the horizontal speed of the device is equal to approximately zero.

Aspect 3. The apparatus of any one of Aspects 1 or 2, wherein the at least one processor is configured to: determine the current external positioning assistance data for the device is within a threshold difference from previous external positioning assistance data for the device; and determine the device is static based on determining the current external positioning assistance data for the device is within the threshold difference from the previous external positioning assistance data for the device.

Aspect 4. The apparatus of any one of Aspects 1 to 3, wherein the at least one processor is configured to: determine a respective elevation and azimuth of each SV of the plurality of SVs changed by less than a threshold number of degrees; and determine the device is static based on determining the respective elevation and azimuth of each SV changed by less than the threshold number of degrees.

Aspect 5. The apparatus of any one of Aspects 1 to 4, wherein the at least one processor is configured to obtain the current external positioning assistance data from one or more terrestrial sensors.

Aspect 6. The apparatus of any one of Aspects 1 to 5, wherein each SV of the plurality of SVs is a Global Navigation Satellite System (GNSS) satellite.

Aspect 7. The apparatus of any one of Aspects 1 to 6, wherein the at least one processor is configured to output a position of the device for emergency location services.

Aspect 8. The apparatus of any one of Aspects 1 to 7, wherein the threshold number of SVs is four SVs.

Aspect 9. A method for determining one or more positions of a device, the method comprising: determining, by one or more processors, the device is static; determining, by the one or more processors, a plurality of space vehicles (SVs) comprises more than a threshold number of SVs; determining, by the one or more processors, measurement errors of measurements of signals from one or more SVs of the plurality of SVs are greater than a horizontal uncertainty for the device based on current external positioning assistance data for the device; removing, by the one or more processors, the one or more SVs from an SV list comprising the plurality of SVs to generate an updated SV list; and determining, by the one or more processors, the one or more positions for the device based on measurements of signals from SVs in the updated SV list and the current external positioning assistance data.

Aspect 10. The method of Aspect 9, wherein determining the device is static is based on determining a horizontal speed of the device is equal to approximately zero based on measurements of signals from the plurality of SVs.

Aspect 11. The method of any one of Aspects 9 or 10, wherein determining the device is static is based on determining the current external positioning assistance data for the device is within a threshold difference from previous external positioning assistance data for the device.

Aspect 12. The method of any one of Aspects 9 to 11, wherein determining the device is static is based on determining a respective elevation and azimuth of each SV of the plurality of SVs changed by less than a threshold number of degrees.

Aspect 13. The method of any one of Aspects 9 to 12, wherein the current external positioning assistance data is obtained from one or more terrestrial sensors.

Aspect 14. The method of any one of Aspects 9 to 13, wherein each SV of the plurality of SVs is a Global Navigation Satellite System (GNSS) satellite.

Aspect 15. The method of any one of Aspects 9 to 14, wherein the position of the device is used for emergency location services.

Aspect 16. The method of any one of Aspects 9 to 15, wherein the threshold number of SVs is four SVs.

Aspect 17. A non-transitory computer-readable medium having stored thereon instructions that, when executed by at least one processor, cause the at least one processor to: determine a device is static; determine a plurality of space vehicles (SVs) comprises more than a threshold number of SVs; determine measurement errors of measurements of signals from one or more SVs of the plurality of SVs are greater than a horizontal uncertainty for the device based on current external positioning assistance data for the device; remove the one or more SVs from an SV list comprising the plurality of SVs to generate an updated SV list; and determine the one or more positions for the device based on measurements of signals from SVs in the updated SV list and the current external positioning assistance data.

Aspect 18. The non-transitory computer-readable medium of Aspect 17, wherein the instructions, when executed by the at least one processor, cause the at least one processor to: determine a horizontal speed of the device is equal to approximately zero based on measurements of signals from the plurality of SVs; and determine the device is static based on determining that the horizontal speed of the device is equal to approximately zero.

Aspect 19. The non-transitory computer-readable medium of any one of Aspects 17 or 18, wherein the instructions, when executed by the at least one processor, cause the at least one processor to: determine the current external positioning assistance data for the device is within a threshold difference from previous external positioning assistance data for the device; and determine the device is static based on determining the current external positioning assistance data for the device is within the threshold difference from the previous external positioning assistance data for the device.

Aspect 20. The non-transitory computer-readable medium of any one of Aspects 17 to 19, wherein the instructions, when executed by the at least one processor, cause the at least one processor to: determine a respective elevation and azimuth of each SV of the plurality of SVs changed by less than a threshold number of degrees; and determine the device is static based on determining the respective elevation and azimuth of each SV changed by less than the threshold number of degrees.

Aspect 21. The non-transitory computer-readable medium of any one of Aspects 17 to 20, wherein the instructions, when executed by the at least one processor, cause the at least one processor to obtain the current external positioning assistance data from one or more terrestrial sensors.

Aspect 22. The non-transitory computer-readable medium of any one of Aspects 17 to 21, wherein each SV of the plurality of SVs is a Global Navigation Satellite System (GNSS) satellite.

Aspect 23. The non-transitory computer-readable medium of any one of Aspects 17 to 22, wherein the instructions, when executed by the at least one processor, cause the at least one processor to output a position of the device for emergency location services.

Aspect 24. The non-transitory computer-readable medium of any one of Aspects 17 to 23, wherein the threshold number of SVs is four SVs.

Aspect 25. An apparatus including one or more means for performing operations according to any of Aspects 9 to 16.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. An apparatus for determining one or more positions of a device, the apparatus comprising:

at least one memory; and at least one processor coupled to the at least one memory and configured to:

determine the device is static;

determine a plurality of space vehicles (SVs) comprises more than a threshold number of SVs;

determine measurement errors of measurements of signals from one or more SVs of the plurality of SVs are greater than a horizontal uncertainty for the device based on current external positioning assistance data for the device;

remove the one or more SVs from an SV list comprising the plurality of SVs to generate an updated SV list; and determine the one or more positions for the device based on measurements of signals from SVs in the updated SV list and the current external positioning assistance data.

2. The apparatus of claim 1, wherein the at least one processor is configured to:

determine a horizontal speed of the device is equal to approximately zero based on measurements of signals from the plurality of SVs; and determine the device is static based on determining that the horizontal speed of the device is equal to approximately zero.

3. The apparatus of claim 1, wherein the at least one processor is configured to:

determine the current external positioning assistance data for the device is within a threshold difference from previous external positioning assistance data for the device; and determine the device is static based on determining the current external positioning assistance data for the device is within the threshold difference from the previous external positioning assistance data for the device.

4. The apparatus of claim 1, wherein the at least one processor is configured to:

determine a respective elevation and azimuth of each SV of the plurality of SVs changed by less than a threshold number of degrees; and determine the device is static based on determining the respective elevation and azimuth of each SV changed by less than the threshold number of degrees.

5. The apparatus of claim 1, wherein the at least one processor is configured to obtain the current external positioning assistance data from one or more terrestrial sensors.

6. The apparatus of claim 1, wherein each SV of the plurality of SVs is a Global Navigation Satellite System (GNSS) satellite.

7. The apparatus of claim 1, wherein the at least one processor is configured to output a position of the device for emergency location services.

8. The apparatus of claim 1, wherein the threshold number of SVs is four SVs.

9. A method for determining one or more positions of a device, the method comprising:

determining, by one or more processors, the device is static;

determining, by the one or more processors, a plurality of space vehicles (SVs) comprises more than a threshold number of SVs;

determining, by the one or more processors, measurement errors of measurements of signals from one or more SVs of the plurality of SVs are greater than a horizontal uncertainty for the device based on current external positioning assistance data for the device;

removing, by the one or more processors, the one or more SVs from an SV list comprising the plurality of SVs to generate an updated SV list; and determining, by the one or more processors, the one or more positions for the device based on measurements of signals from SVs in the updated SV list and the current external positioning assistance data.

10. The method of claim 9, wherein determining the device is static is based on determining a horizontal speed of the device is equal to approximately zero based on measurements of signals from the plurality of SVs.

11. The method of claim 9, wherein determining the device is static is based on determining the current external positioning assistance data for the device is within a threshold difference from previous external positioning assistance data for the device.

12. The method of claim 9, wherein determining the device is static is based on determining a respective elevation and azimuth of each SV of the plurality of SVs changed by less than a threshold number of degrees.

13. The method of claim 9, wherein the current external positioning assistance data is obtained from one or more terrestrial sensors.

14. The method of claim 9, wherein each SV of the plurality of SVs is a Global Navigation Satellite System (GNSS) satellite.

15. The method of claim 9, wherein the position of the device is used for emergency location services.

16. The method of claim 9, wherein the threshold number of SVs is four SVs.

17. A non-transitory computer-readable medium having stored thereon instructions that, when executed by at least one processor, cause the at least one processor to:

determine a device is static;

determine a plurality of space vehicles (SVs) comprises more than a threshold number of SVs;

determine measurement errors of measurements of signals from one or more SVs of the plurality of SVs are greater than a horizontal uncertainty for the device based on current external positioning assistance data for the device;

remove the one or more SVs from an SV list comprising the plurality of SVs to generate an updated SV list; and determine the one or more positions for the device based on measurements of signals from SVs in the updated SV list and the current external positioning assistance data.

18. The non-transitory computer-readable medium of claim 17, wherein the instructions, when executed by the at least one processor, cause the at least one processor to:

determine a horizontal speed of the device is equal to approximately zero based on measurements of signals from the plurality of SVs; and determine the device is static based on determining that the horizontal speed of the device is equal to approximately zero.

19. The non-transitory computer-readable medium of claim 17, wherein the instructions, when executed by the at least one processor, cause the at least one processor to:

determine the current external positioning assistance data for the device is within a threshold difference from previous external positioning assistance data for the device; and determine the device is static based on determining the current external positioning assistance data for the device is within the threshold difference from the previous external positioning assistance data for the device.

20. The non-transitory computer-readable medium of claim 17, wherein the instructions, when executed by the at least one processor, cause the at least one processor to:

determine a respective elevation and azimuth of each SV of the plurality of SVs changed by less than a threshold number of degrees; and determine the device is static based on determining the respective elevation and azimuth of each SV changed by less than the threshold number of degrees.

\* \* \* \* \*